US010313378B2

(12) United States Patent
Makavy (10) Patent No.: US 10,313,378 B2
(45) Date of Patent: Jun. 4, 2019

(54) METHODS AND SYSTEMS FOR DETECTING VIRUSES IN EMAILS

(71) Applicant: FACEBOOK, INC., Menlo Park, CA (US)

(72) Inventor: Noam Makavy, Givatayim (IL)

(73) Assignee: FACEBOOK, INC., Menlo Park, CA (US)

( * ) Notice: Subject to any disclaimer, the term of this patent is extended or adjusted under 35 U.S.C. 154(b) by 127 days.

(21) Appl. No.: 15/423,505

(22) Filed: Feb. 2, 2017

(65) Prior Publication Data
US 2018/0219892 A1    Aug. 2, 2018

(51) Int. Cl.
*H04L 12/58* (2006.01)
*H04L 29/06* (2006.01)

(52) U.S. Cl.
CPC .......... *H04L 63/1425* (2013.01); *H04L 51/12* (2013.01); *H04L 2463/121* (2013.01)

(58) Field of Classification Search
CPC ............................ H04L 63/1425; H04L 51/04
See application file for complete search history.

(56) References Cited

U.S. PATENT DOCUMENTS

2016/0366165 A1* 12/2016 Stolfo .................... H04L 51/12

* cited by examiner

*Primary Examiner* — Oleg Korsak
(74) *Attorney, Agent, or Firm* — Morgan, Lewis & Bockius LLP (57) ABSTRACT

A method of monitoring email use is performed at a server system by monitoring email use in a first email application at a first device distinct from the server system and monitoring email use in a second email application at a second device distinct from the server system. An inconsistency in the monitored email use is detected for a first email that is received by the second device and appears to have been sent from the first device. In response to detecting the inconsistency, the first email is identified as being potentially malicious. At least one of the first and second devices may be notified that the first email is potentially malicious.

15 Claims, 9 Drawing Sheets

METHODS AND SYSTEMS FOR DETECTING VIRUSES IN EMAILS

TECHNICAL FIELD

This relates generally to detecting viruses and/or other malicious content in emails including but not limited to monitoring email accounts.

BACKGROUND

Emails provide a convenient means of communications between individuals. However, emails may contain malicious content. Specific users may be targeted to receive malicious content. Many techniques for identifying emails with malicious content use heuristics that are prone to both false positives and false negatives.

SUMMARY

Accordingly, there is a need for accurate methods and systems for detecting malicious content in email. Detecting emails with malicious content allows users to avoid opening malicious emails and avoid becoming vulnerable to cyber-attacks (e.g., Trojans, viruses, etc.).

In accordance with some embodiments, a method is performed at a server system with one or more processors and memory storing instructions for execution by the one or more processors. The server system is associated with an email monitoring service. The method includes monitoring email use in a first email application at a first device distinct from the server system and monitoring email use in a second email application at a second device distinct from the server system. The method further includes detecting an inconsistency in the monitored email use for a first email that is received by the second device and appears to have been sent from the first device. The method also includes, in response to detecting the inconsistency, identifying the first email as being potentially malicious. At least one of the first and second devices may be notified that the first email is potentially malicious.

In accordance with some embodiments, a server system associated with an email monitoring service includes one or more processors and memory storing one or more programs for execution by the processor. The one or more programs include instructions for performing the operations of the method described above. In accordance with some embodiments, a non-transitory computer-readable storage medium stores instructions that, when executed by a server system, cause the server system to perform the operations of the method described above.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first device could be termed a second device, and, similarly, a second device could be termed a first device, without departing from the scope of the various described embodiments. The first device and the second device are both devices, but they are not the same device.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
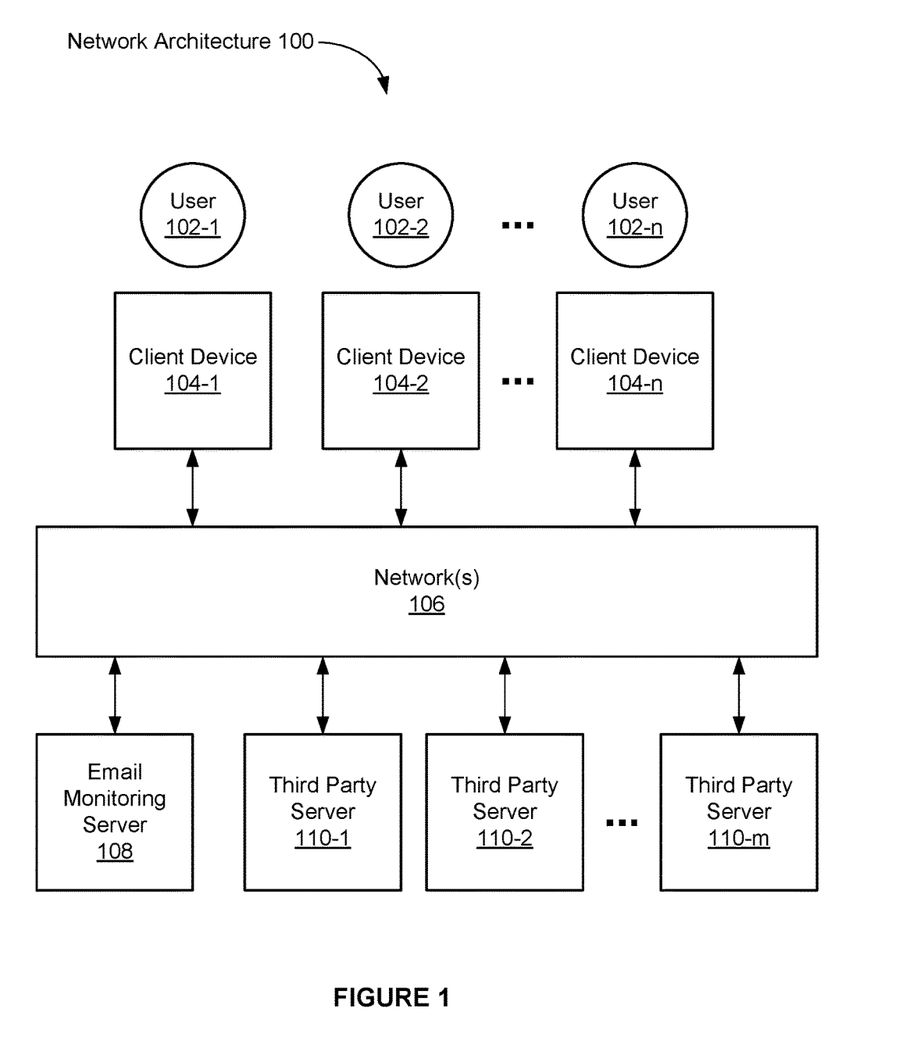
FIG. 1 is a block diagram illustrating an exemplary network architecture of a social network in accordance with some embodiments.

FIG. 1 is a block diagram illustrating an exemplary network architecture of a social network in accordance with some embodiments. The network architecture 100 includes a number of client devices (also called "client systems," "client computers," or "clients") 104-1, 104-2, . . . 104-n communicably connected to an email monitoring server system 108 by one or more networks 106.

In some embodiments, the client devices 104-1, 104-2, . . . 104-n are computing devices such as smart watches, personal digital assistants, portable media players, smart phones, tablet computers, 2D gaming devices, 3D gaming devices, virtual reality devices, laptop computers, desktop computers, televisions with one or more processors embedded therein or coupled thereto, in-vehicle information systems (e.g., an in-car computer system that provides navigation, entertainment, and/or other information), or other appropriate computing devices that can be used to communicate with an electronic social network system and other computing devices (e.g., via the electronic social network system). In some embodiments, the email monitoring server system 108 is a single computing device such as a computer server, while in other embodiments, the email monitoring server system 108 is implemented by multiple computing devices working together to perform the actions of a server system (e.g., cloud computing). In some embodiments, the network 106 is a public communication network (e.g., the Internet or a cellular data network), a private communications network (e.g., private LAN or leased lines), or a combination of such communication networks.

Users 102-1, 102-2, . . . 102-n employ the client devices 104-1, 104-2, . . . 104-n to send and receive mails and to access the email monitoring server system 108 and third-party servers 110-1, 110-2, . . . 110-m. For example, one or more of the client devices 104-1, 104-2, . . . 104-n execute email applications and/or web browser applications that can be used to access email services. As another example, one or more of the client devices 104-1, 104-2, . . . 104-n execute software applications that are specific to the one or more social networks (e.g., social networking "apps" running on smart phones or tablets, such as a Facebook social networking application, a messaging application, etc., running on an iPhone, Android, or Windows smart phone or tablet).

Users interacting with the client devices 104-1, 104-2, . . . 104-n can participate in a social networking service by providing and/or consuming (e.g., posting, writing, viewing, publishing, broadcasting, promoting, recommending, sharing) information, such as text comments (e.g., statuses, updates, announcements, replies, location "check-ins," private/group messages), digital content (e.g., photos (i.e., images), videos, audio files, links, documents), and/or other electronic content. In some embodiments, users provide information to a page, group, message board, feed, and/or user profile of a social networking service (e.g., provided by the email monitoring server system 108 or a third-party server 110). Users of the social networking service can also annotate information posted by other users of the social networking service (e.g., endorsing or "liking" a posting of another user, commenting on a posting by another user, or sharing a posting of another user).

Figure 3:
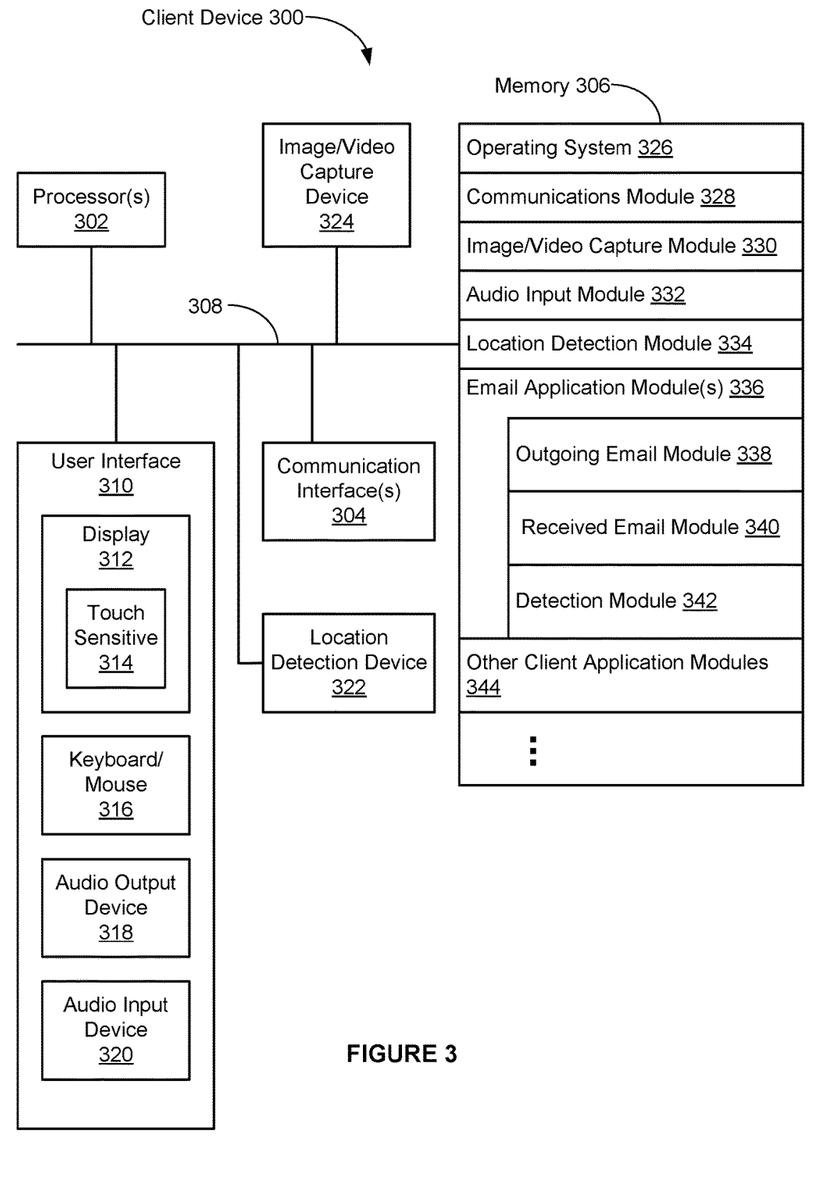
FIG. 3 is a block diagram illustrating an exemplary client device, in accordance with some embodiments.

In some embodiments, a software application executing on a mobile client device, with proper permissions, may obtain information from hardware resources/components of the client device (e.g., image/video capture device 324, location detection device 322, microphone, sensors, etc., FIG. 3). For example, global navigation satellite system (GNSS) (e.g., GPS, GLONASS, Galileo, BeiDou) or other geo-location capabilities (e.g., Wi-Fi or hybrid positioning systems) may be accessed by a software application on the client device (e.g., social network client module 340, FIG. 3) to determine the user's location and update a server system 108 or 110 with the user's location (e.g., "At Home," "At Work," or "In San Francisco, Calif.") and/or with information derived from and/or based on the user's location. Users interacting with the client devices 104-1, 104-2, . . . 104-n can also use the online service provided by an online service server (e.g., server system 108) to define groups of users. Users interacting with the client devices 104-1, 104-2, . . . 104-n can also use an online service (e.g., provided by the server system 108) to communicate and collaborate with each other.

In some implementations, third-party servers 110 are associated with third-party service providers who provide services and/or features to users of a network (e.g., users of the server system 108, FIG. 1). Users may conduct transactions (e.g., financial transactions) with the third-party service providers by communicating and exchanging data with third-party servers 110 directly (e.g., via networks 106) and/or indirectly (e.g., via server system 108).

For example, in some embodiments, a given third-party server 110 is used to host third-party websites that provide pages to client devices 104, either directly or in conjunction with the server system 108. In some embodiments, a given third-party server 110 is used to host third-party applications that are used by client devices 104, either directly or in conjunction with the server system 108.

In some embodiments, users may access third-party services by loading pages associated with third-party service providers within an application for a service provider distinct from the third-party service providers (e.g., by selecting links provided within social network client module 340 to access pages of a third-party service). Pages are a type of digital document that may include some common elements of other web documents (e.g., document includes markup language, such as Hyper Text Markup Language (HTML), Extensible Markup Language (XML), Java, etc.).

Pages may also include script (e.g., one or more distinct scripts) (e.g., JavaScript inserted into the page by a server system 108 or 110) for calling one or more application programming interfaces (APIs) of a server system (e.g., one or more APIs of a server system 108 or 110) to obtain user information (e.g., location information, payment credentials, profile information, etc. collected and stored in connection with using the online service). The script may be executed at some time during a user's interaction with the loaded page (e.g., when the page is loaded, in response to a detected interaction within a loaded page, etc.).

The script allows user information maintained by the online service to be leveraged in transactions conducted between users and third-party service providers. These implementations provide a more efficient, integrated, and seamless alternative to accessing third-party services and features via stand-alone third-party applications (e.g., other client application modules 344, distinct from social network client module 340, FIG. 3), while optionally leveraging user information maintained in connection with other service providers in a network (e.g., an online service provided by server system 108).

Exemplary third-party services (e.g., provided by third-party service providers) include, but are not limited to, services, products, and/or applications for or related to: books, business, communication, contests, e-commerce (e.g., pages for purchasing goods or services from online retailers), education, entertainment, fashion, finance, food and drink, games, health and fitness, lifestyle, local information (e.g., pages for real-time viewing of mass transit schedules), movies (e.g., pages for movie reviews, purchasing movie tickets, etc.), television, music and audio, news, photos, video, productivity, reference material, security, shopping, sports, travel, utilities, and the like. In some embodiments, a given third-party server 110 is used to host enterprise systems, which are used by client devices 104, either directly or in conjunction with the server system 108. In some embodiments, a given third-party server 110 is used to provide third-party content (e.g., news articles, reviews, message feeds, etc.).

In some embodiments, a given third-party server 110 is a single computing device (e.g., server computer), while in other embodiments, a given third-party server 110 is implemented by multiple computing devices working together to perform the actions of a server system (e.g., cloud computing).

Figure 2:
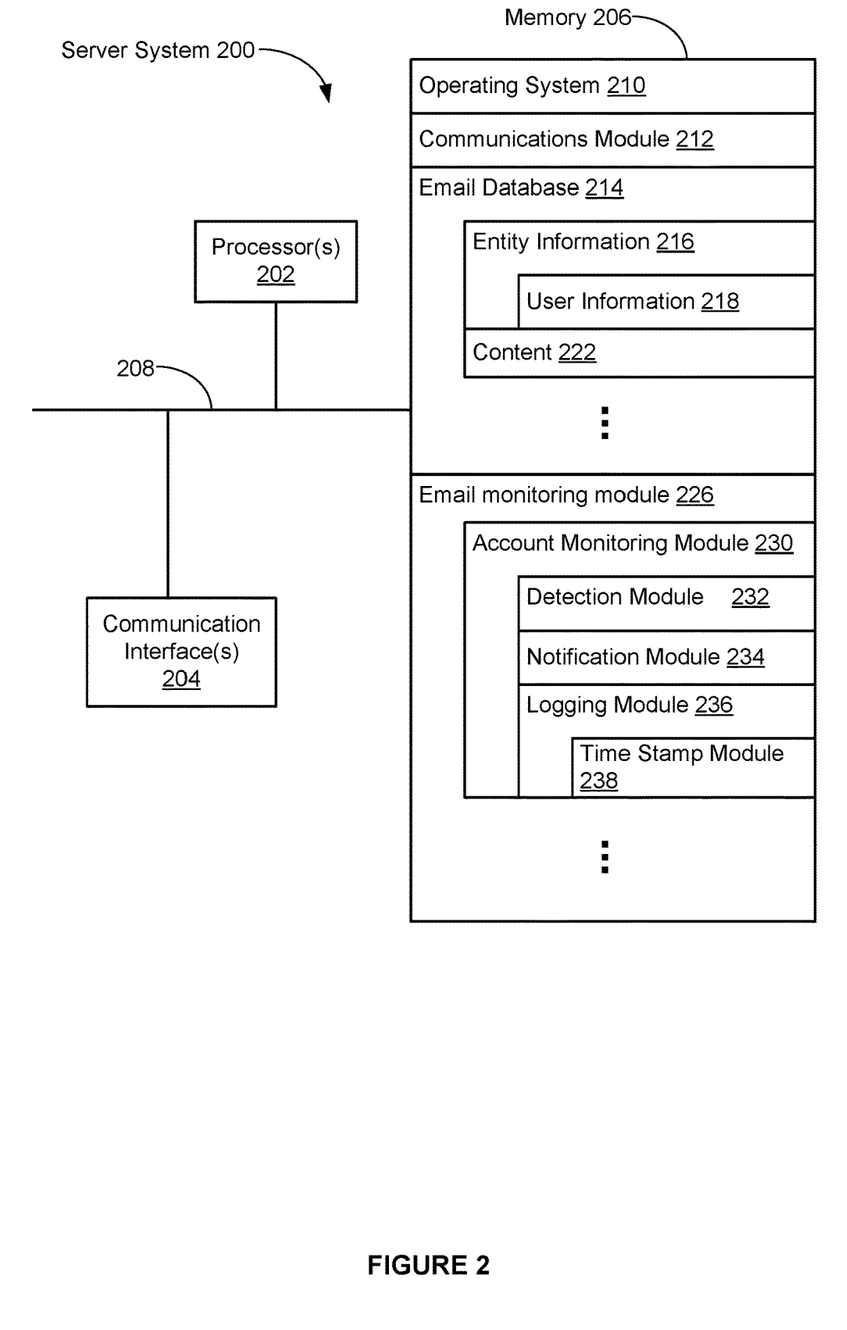
FIG. 2 is a block diagram illustrating an exemplary server system in accordance with some embodiments.

FIG. 2 is a block diagram illustrating an exemplary server system 200 in accordance with some embodiments. In some embodiments, the server system 200 is an example of an email monitoring server system 108. The server system 200 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The server system 200 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Memory 206 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the processor(s) 202. Memory 206, or alternately the non-volatile memory device(s) within memory 206, includes a non-transitory computer readable storage medium. In some embodiments, memory 206 or the computer readable storage medium of memory 206 stores the following programs, modules, and data structures, or a subset or superset thereof:
- an operating system 210 that includes procedures for handling various basic system services and for performing hardware dependent tasks;
- a network communication module 212 that is used for connecting server system 200 (e.g., email monitoring server system 108, FIG. 1) to other computers (e.g., client devices 104-1, 104-2, . . . 104-n, and/or third party servers) via the one or more communication network interfaces 204 (wired or wireless) and one or more communication networks, such as the Internet, cellular telephone networks, mobile data networks, other wide area networks, local area networks, metropolitan area networks, and so on;
- an email database 214 for storing data associated with the email monitoring service, such as:
  entity information 216, such as user information 218; and
  user content 222 (e.g., emails);
- an email monitoring module 226 for providing email monitoring services and related features (e.g., in conjunction with email application module 336 on the client device 300, FIG. 3), which includes:
  an account monitoring module 230 including an email detection module 232, a notification module 234 for providing notifications to notifications to monitored devices, and a logging module 236 for logging incoming and outgoing emails in conjunction with time stamp module 238.

The email database 214 stores data associated with the server system 200 in one or more types of databases, such as graph, dimensional, flat, hierarchical, network, object-oriented, relational, and/or XML databases.

Entity information 216 includes user information 218, such as user profiles, user profile pictures, other pictures associated with the user (e.g., images where the user has been tagged or identified by image analysis software), a plurality of icons, login information, payment credentials (e.g., credit-card or debit-card information, bank information, etc. for conducting financial transactions through the social networking service), privacy and other preferences, biographical data, and the like. In some embodiments, for a given user, the user information 218 includes the user's name, profile picture, a plurality of icons, contact information, birth date, sex, marital status, family status, employment, education background, preferences, interests, and/or other demographic information. In some embodiments, the user information may include other information, such as likes and comments, associated with say, profile pictures of the user (or other photos of the user).

In some embodiments, content 222 includes text (e.g., ASCII, SGML, HTML), images (e.g., jpeg, tif and gif), graphics (e.g., vector-based or bitmap), audio, video (e.g., mpeg), other multimedia, and/or combinations thereof. In some embodiments, content 222 includes executable code (e.g., script for API calls), podcasts, links, and/or the like. In some embodiments content 222 contains posts 223 (e.g., social media posts), and/or advertisements 225.

FIG. 3 is a block diagram illustrating an exemplary client device 300, in accordance with some embodiments. The client device 300 is an example of the one or more client devices 104-1, 104-2, . . . 104-n (FIG. 1). The client device 300 typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 300 includes a user interface 310. The user interface 310 typically includes a display device 312. In some embodiments, the client device 300 includes inputs such as a keyboard, mouse, and/or other input buttons 316. Alternatively or in addition, in some embodiments, the display device 312 includes a touch-sensitive surface 314, in which case the display device 312 is a touch-sensitive display. In some embodiments, the touch-sensitive surface 314 is configured to detect various swipe gestures (e.g., continuous gestures in vertical and/or horizontal directions) and/or other gestures (e.g., single/double tap). In client devices that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 300 use a microphone and voice recognition to supplement or replace the keyboard. Optionally, the client device 300 includes an audio input device 320 (e.g., a microphone) to capture audio (e.g., speech from a user). Optionally, the client device 300 includes a location detection device 322, such as a GNSS (e.g., GPS, GLONASS, etc.) or other geo-location receiver, for determining the location of the client device 300. The client device 300 also optionally includes an image/video capture device 324, such as a camera and/or a webcam.

In some embodiments, the client device 300 includes one or more optional sensors (e.g., gyroscope, accelerometer) for detecting motion and/or a change in orientation of the client device. In some embodiments, the detected motion and/or orientation of the client device 300 (e.g., the motion/change in orientation corresponding to a user input produced by a user of the client device) is used to manipulate an interface (or content within the interface) displayed on the client device 300. In some embodiments, the one or more optional sensors may include an optical projection sensor for projecting an interface displayed on the client device 300 in 3D (e.g., project 3D hologram). Moreover, a user may manipulate the interface displayed on the client device 300 by interacting with the projected holographic 3D display.

Memory 306 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 306 may optionally include one or more storage devices remotely located from the processor(s) 302. Memory 306, or alternately the non-volatile memory device(s) within memory 306, includes a non-transitory computer-readable storage medium. In some embodiments, memory 306 or the computer-readable storage medium of memory 306 stores the following programs, modules, and data structures, or a subset or superset thereof:

- an operating system 326 that includes procedures for handling various basic system services and for performing hardware dependent tasks;
- a network communication module 328 that is used for connecting the client device 300 to other computers via the one or more communication network interfaces 304 (wired or wireless) and one or more communication networks, such as the Internet, cellular telephone networks, mobile data networks, other wide area networks, local area networks, metropolitan area networks, and so on;
- an image/video capture module 330 (e.g., a camera module) for processing a respective image or video captured by the image/video capture device 324;
- an audio input module 332 (e.g., a microphone module) for processing audio captured by the audio input device 320;
- a location detection module 334 (e.g., a GPS, Wi-Fi, or hybrid positioning module) for determining the location of the client device 104 (e.g., using the location detection device 322) and providing this location information for use in various applications; and
- email application module 336, including the following modules (or sets of instructions), or a subset or superset thereof:
  - outgoing email module 338 for composing, sending, and retaining outgoing emails;
  - a received email module 340 for retrieving, receiving, and retaining incoming emails; and
  - detection module 342 for detecting emails with potentially malicious content; and
- optional client application modules 344, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D gaming, virtual reality, electronic book reader, and/or workout support; and.

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 306 store a subset of the modules and data structures identified above. Furthermore, memory 206 and/or 306 optionally store additional modules and data structures not described above.

Figure 4:
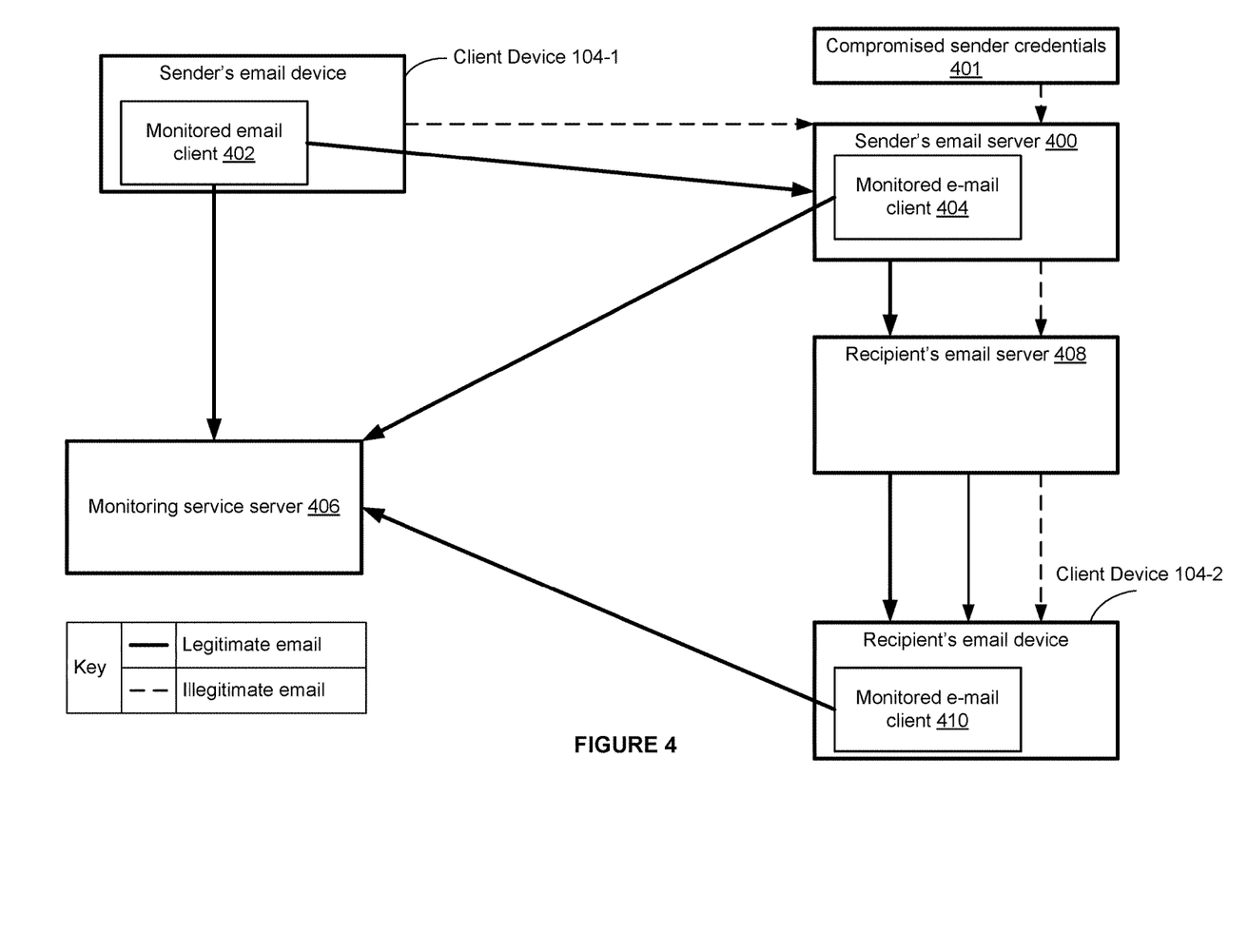
FIG. 4 illustrates an exemplary block diagram displaying methods of sending, receiving, and monitoring legitimate emails and malicious emails in accordance with some embodiments.

FIG. 4 illustrates an exemplary block diagram displaying methods of sending, receiving, and monitoring legitimate emails and malicious emails in accordance with some embodiments. FIG. 4 is discussed below in conjunction with FIGS. 5A-5E.

Figure 5A:
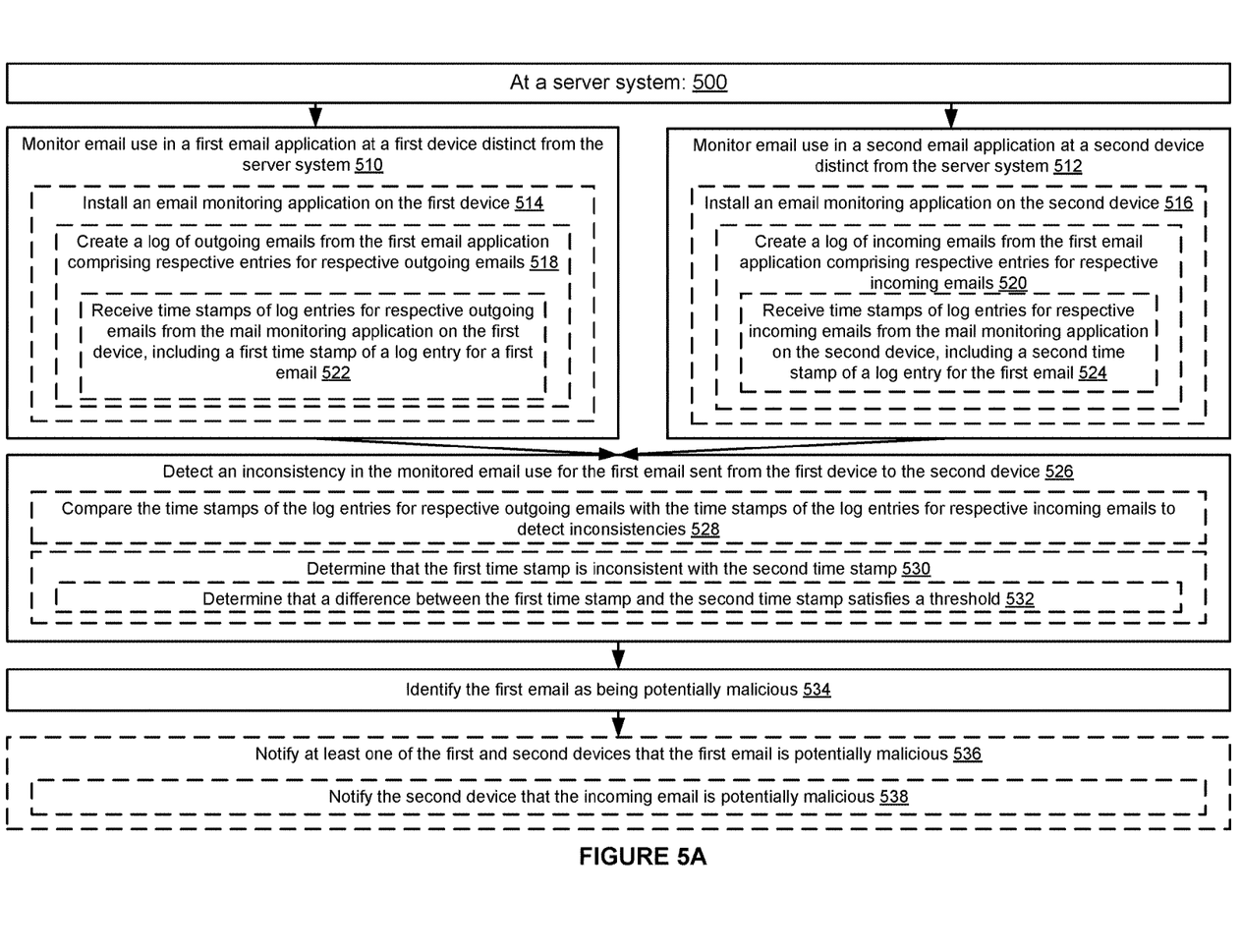
FIGS. 5A-5E are flow diagrams illustrating methods of monitoring emails to detect malicious content in accordance with some embodiments.
Figure 5B:
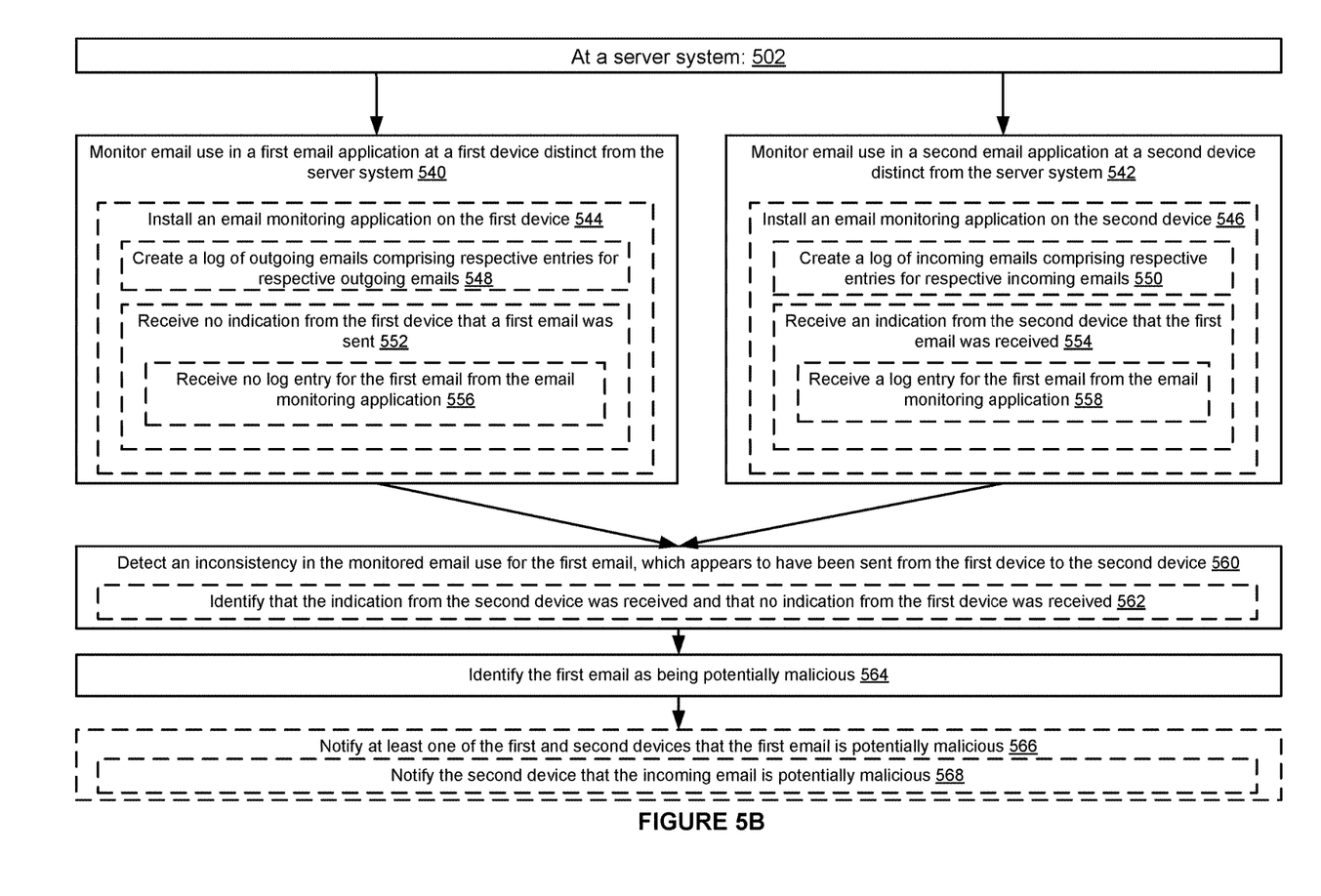
Figure 5C:
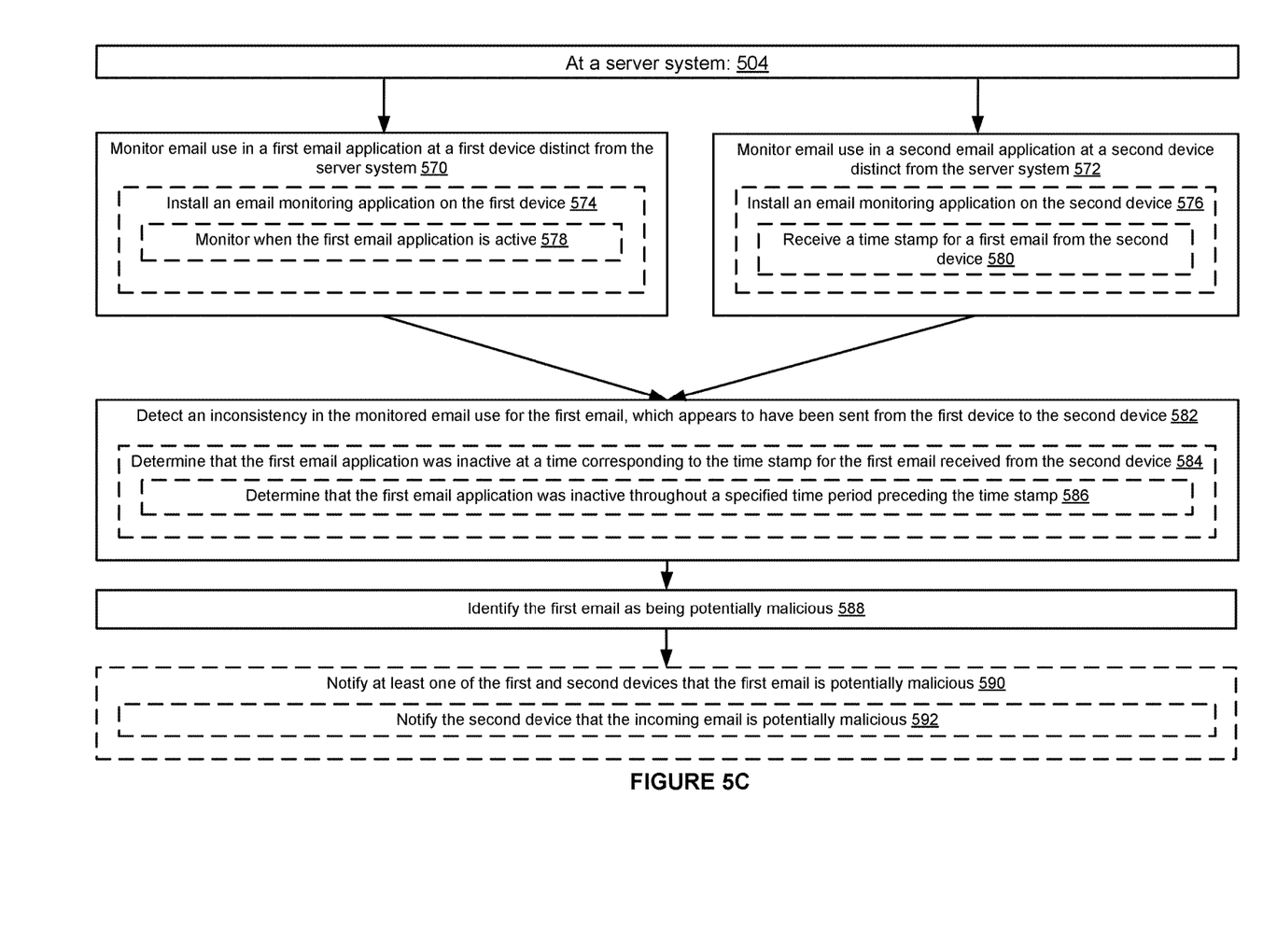
Figure 5D:
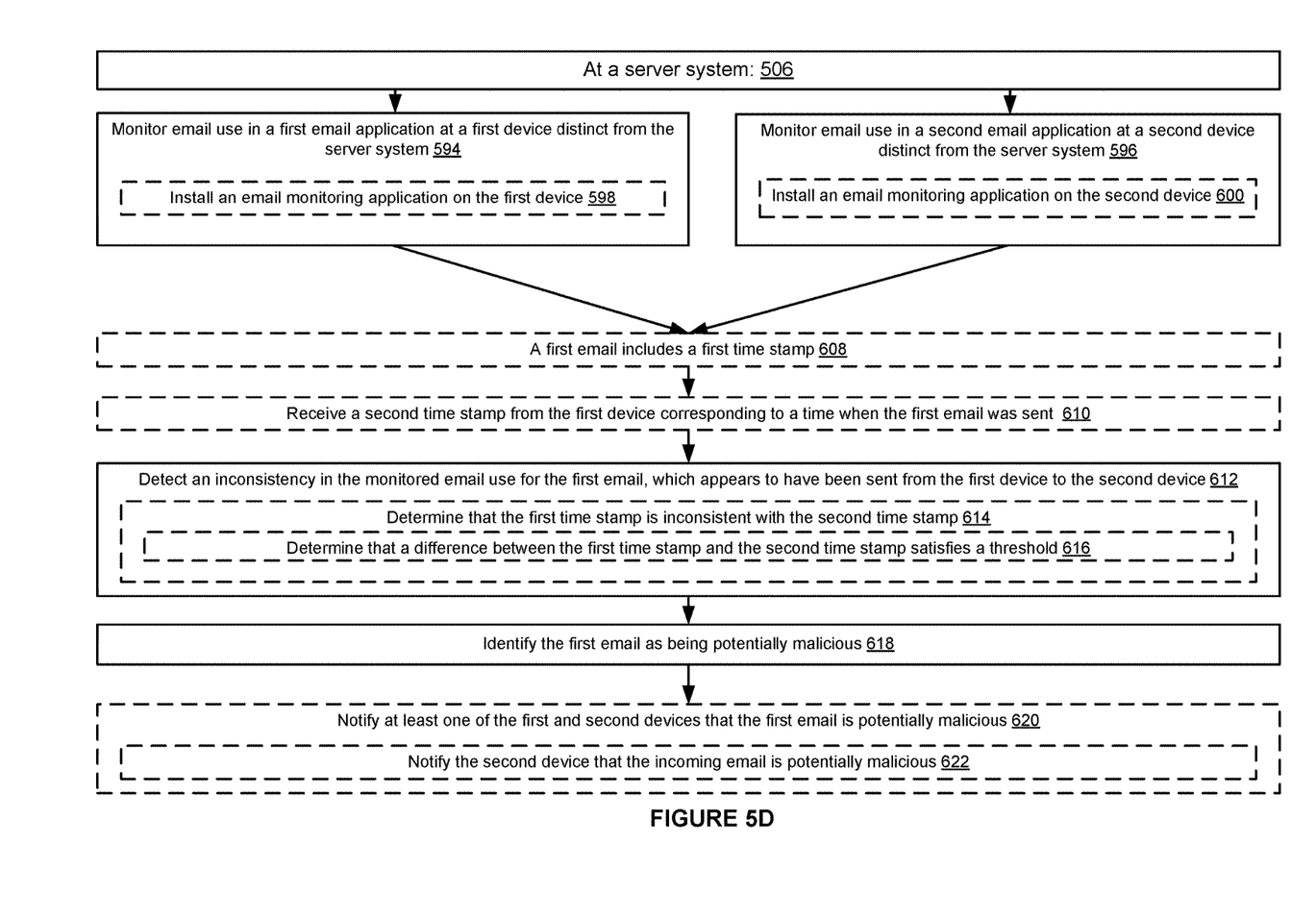
Figure 5E:
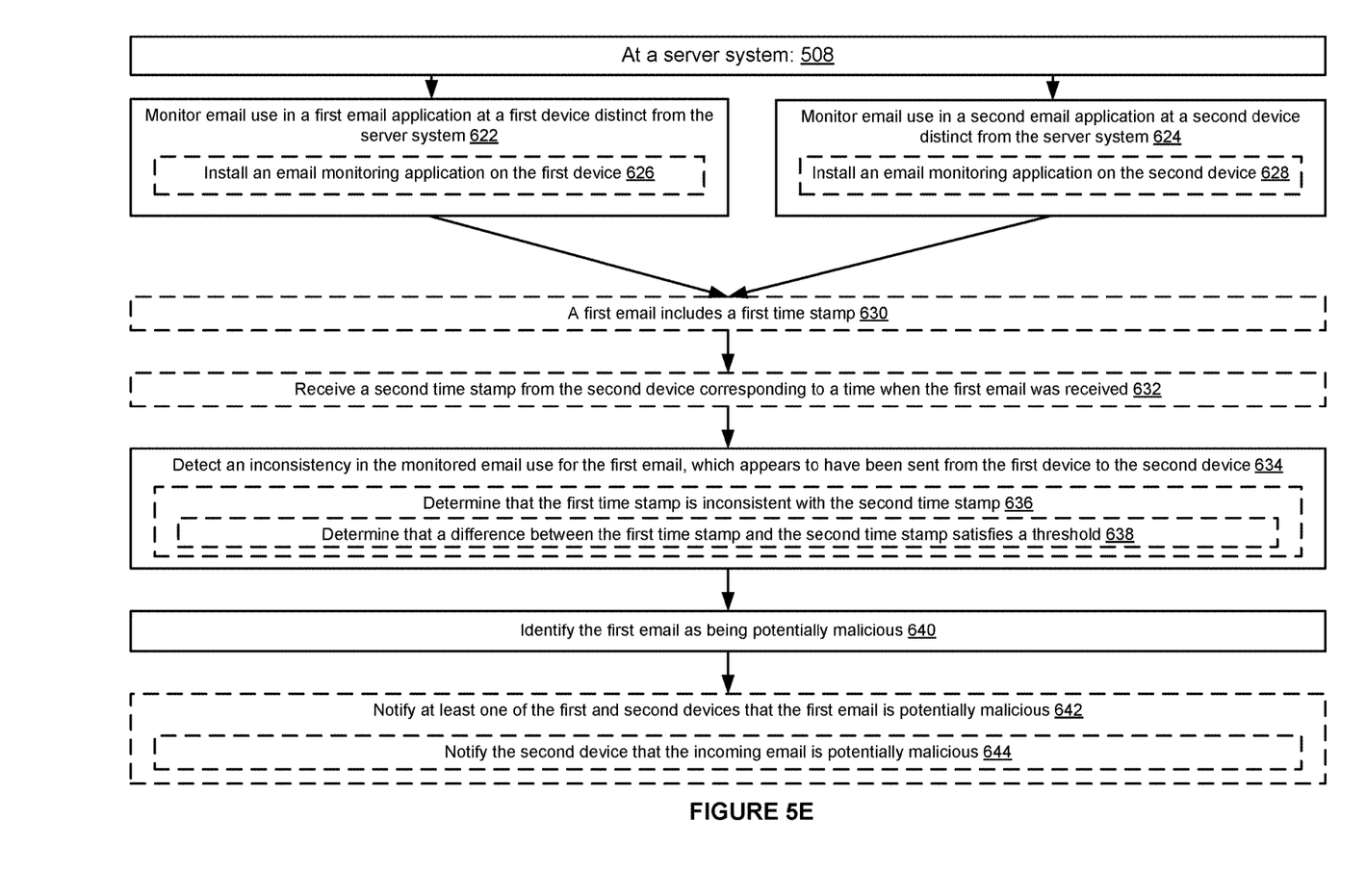

FIG. 5A is a flow diagram illustrating a method 500. FIG. 5B is a flow diagram illustrating a method 502. FIG. 5C is a flow diagram illustrating a method 504. FIG. 5D is a flow diagram illustrating a method 506. FIG. 5E is a flow diagram illustrating a method 508. The methods 500, 502, 504, 506, and 508 may be performed by an email monitoring system (e.g., email monitoring server system 108, FIG. 1; server system 200, FIG. 2; monitoring service server 406, FIG. 4). FIGS. 5A-5E correspond to instructions stored in a computer memory or computer-readable storage medium (e.g., memory 206 of the server system 200, FIG. 2). The methods 500, 502, 504, 506, and 508 involve first and second devices in addition to the email monitoring system. In some embodiments, the first device is a first client device 104-1 and the second device is a second client device 104-2 (FIG. 4). In some embodiments, the first device is a first client device 104-1 and the second device is an email server 400 (FIG. 4). In some embodiments, the first device is an email server 400 and the second device is a second client device 104-2 (FIG. 4). For example, the operations of each of the methods 500, 502, 504, 506, and 508 are performed, at least in part, by an email monitoring server module (e.g., email monitoring module 226, FIG. 2) in conjunction with client application modules (e.g., email application modules 336, FIG. 3).

In performing the method 500 (FIG. 5A), the email monitoring system monitors 510 email use in a first email application (e.g., monitored email client 402 or 404, FIG. 4) at a first device distinct from the server system and monitors 512 email use in a second email application (e.g., monitored email client 404 or 410, FIG. 4) at a second device distinct from the server system. For example, in FIG. 4, monitoring service server 406 monitors email client 402, 404, and/or 410 on the first client device 104-1 (i.e., the sender's e-mail device), the sender's email server 400, and the second client device 104-2 (i.e., the recipient's e-mail device).

In some embodiments, the email monitoring system installs 514 an email monitoring application on the first device. In some embodiments, the email monitoring system installs 516 an email monitoring application on the second device. The email monitoring applications monitor emails on the respective email client applications and may report back to the email monitoring system. For example, the email monitoring applications may be the monitored email clients 402, 404, and/or 410 themselves, plug-ins for the monitored email clients 402, 404, and/or 410, or separate applications that monitor the monitored email clients 402, 404, and/or 410 (FIG. 4).

In some embodiments, the email monitoring application on the first device creates 518 a log of outgoing emails from the first email application comprising respective entries for respective outgoing emails. In some embodiments the email monitoring application on the second device creates 520 a log of incoming emails from the first email application comprising respective entries for respective incoming emails. For example, monitoring service server 406 (FIG. 4) stores a log of data containing log entries of outgoing and incoming emails from monitored email clients 402, 404, and/or 410 (FIG. 4).

In some embodiments, the email monitoring system receives 522 time stamps of log entries for respective outgoing emails from the mail monitoring application on the first device, including a first time stamp of a log entry for a first email. In some embodiments, the email monitoring system receives 524 time stamps of log entries for respective incoming emails from the mail monitoring application on the second device, including a second time stamp of a log entry for the first email.

The email monitoring system detects 526 an inconsistency in the monitored email use for the first email sent from the first device to the second device (or that is received at the second device and appears to have been sent from the first device). In some embodiments the server system compares 528 the time stamps of the log entries for respective outgoing emails with time stamps of the log entries for respective incoming emails to detect inconsistencies. In some embodiments, the email monitoring system determines 530 that the first time stamp is inconsistent with the second time stamp. The email monitoring system may determine 532 that a difference between the first time stamp and the second time stamp satisfies (e.g., is greater than, or greater than or equal to) a threshold. For example, in FIG. 4, an email may be sent, or appear to have been sent, from the monitored email client 402 on the sender's email device to the sender's monitored email client 404 on the email server 400. The monitoring service server 406 logs first and second timestamps for the email and compares the difference between the two timestamps to the threshold.

In response to detecting the inconsistency, the email monitoring system identifies 534 the first email as being potentially malicious. The inconsistency (e.g., a difference in time stamps that satisfies the threshold) indicates that the first email may have been sent by malware on the sender's email device 104-1 or by another device using the sender's compromised credentials.

In some embodiments, the email monitoring system notifies 536 at least one of the first and second devices that the first email is potentially malicious. For example, the server system notifies 538 the second device that the incoming email is potentially malicious. The email monitoring system may notify the second device that the incoming email is potentially malicious by presenting a notification to the user of the second device with a warning and/or by instructing the second device to segregate the incoming email (e.g., move the email to a spam folder, delete the email, etc.). The email monitoring system may notify the first device that it may be infected or that its user's credentials may have been compromised.

In performing the method 502 (FIG. 5B), the server system monitors 540 email use in a first email application (e.g., monitored email client 402 or 404, FIG. 4) at a first device distinct from the server system and monitors 542 email use in a second email application (e.g., monitored email client 404 or 410, FIG. 4) at a second device distinct from the server system.

In some embodiments, the email monitoring system installs 544 an email monitoring application on the first device and installs 546 an email monitoring application on the second device (e.g., as described for steps 514 and 516, FIG. 5A).

In some embodiments the email monitoring applications create 548 a log of outgoing emails comprising respective entries for respective outgoing emails and create 550 a log of incoming emails comprising respective entries for respective incoming emails. The email monitoring applications may send these logs, or entries/data from these logs, to the email monitoring system.

In some embodiments, the email monitoring system receives 552 no indication from the first device that a first email was sent and receives 554 an indication from the second device that the first email was received. For example, the email monitoring system receives 556 no log entry for the first email from the email monitoring application and receives 558 a log entry for the first email from the email monitoring application.

The email monitoring system detects 560 an inconsistency in the monitored email use for the first email, which is received by the second device and appears to (e.g., purports to) have been sent from the first device (e.g., has credentials for the first device and/or its user). In some embodiments, the email monitoring system identifies 562 that the indication from the second device was received and that no indication from the first device was received.

In response to identifying the inconsistency, the email monitoring system identifies 564 the first email as being potentially malicious. The inconsistency indicates that the first email was likely not sent by the first email application and instead was sent by malware on the sender's email device or by another device using the sender's compromised credentials.

In some embodiments, the email monitoring system notifies 566 at least one of the first and second devices that the first email is potentially malicious (e.g., as described for steps 536 and 538, FIG. 5A). For example, the email monitoring system notifies 568 the second device that the incoming email is potentially malicious.

In performing the method 504 (FIG. 5C), the email monitoring system monitors 570 email use in a first email application (e.g., monitored email client 402 or 404, FIG. 4) at a first device distinct from the server system and monitors 572 email use in a second email application (e.g., monitored email client 404 or 410, FIG. 4) at a second device distinct from the server system.

In some embodiments, the email monitoring system installs 574 an email monitoring application on the first device and installs 576 an email monitoring application on the second device (e.g., as described for steps 514 and 516, FIG. 5A).

In some embodiments, the email monitoring system monitors 578 when the first email application is active (e.g., using the email monitoring application on the first device). In some embodiments, the email monitoring system receives 580 a time stamp for a first email from the second device (e.g., from the email monitoring application on the second device).

The email monitoring system detects 582 an inconsistency in the monitored email use for the first email, which is received by the second device and appears to have been sent from the first device. In some embodiments, the server determines 584 that the first email application was inactive at a time corresponding to the time stamp for the first email received from the second device. In some embodiments the server determines that the first email application was inactive throughout a specified period preceding the time stamp. This determination indicates that the first email was likely not sent by the first email application and instead was sent by malware on the sender's email device or by another device using the sender's compromised credentials.

In response to detecting the inconsistency, the email monitoring system identifies 588 the first email as being potentially malicious.

In some embodiments, the email monitoring system notifies 590 at least one of the first and second devices that the first email is potentially malicious (e.g., as described for steps 536 and 538, FIG. 5A). For example, the email monitoring system notifies 592 the second device that the incoming email is potentially malicious.

In performing the method 506 (FIG. 5D), the email monitoring system monitors 594 email use in a first email application (e.g., monitored email client 402 or 404, FIG. 4) at a first device distinct from the server system and monitors 596 email use in a second email application (e.g., monitored email client 404 or 410, FIG. 4) at a second device distinct from the server system.

In some embodiments, the email monitoring system installs 598 an email monitoring application on the first device and installs 600 an email monitoring application on the second device (e.g., as described for steps 514 and 516, FIG. 5A).

In some embodiments, the first email includes 608 a first time stamp. In some embodiments, the email monitoring system receives 610 a second time stamp from the first device corresponding to a time when the first email was sent.

The email monitoring system detects 612 an inconsistency in the monitored email use for the first email, which is received by the second device and appears to have been sent from the first device. For example, the server determines 614 that the first time stamp is inconsistent with the second time stamp (e.g., that a difference between the first time stamp and the second time stamp satisfies a threshold). The inconsistency between the time stamps indicates that the first email may have been sent by malware on the sender's email device 104-1 or by another device using the sender's compromised credentials.

In response to detecting the inconsistency, the first email is identified 618 as being potentially malicious.

In some embodiments, the email monitoring system notifies 620 at least one of the first and second devices that the first email is potentially malicious (e.g., as described for steps 536 and 538, FIG. 5A). For example, the server notifies 622 the second device that the incoming email is potentially malicious.

In performing the method 508 (FIG. 5E), the email monitoring system monitors 622 email use in a first email application (e.g., monitored email client 402 or 404, FIG. 4) at a first device distinct from the server system and monitors 624 email use in a second email application (e.g., monitored email client 404 or 410, FIG. 4) at a second device distinct from the server system.

In some embodiments, the email monitoring system installs 626 an email monitoring application on the first device and installs 628 an email monitoring application on the second device (e.g., as described for steps 514 and 516, FIG. 5A).

In some embodiments, a first email includes 630 a time stamp. In some embodiments, the email monitoring system receives 632 a second time stamp from the second device corresponding to a time when the first email was received.

The email monitoring system detects 634 an inconsistency in the monitored email use for the first email, which is received by the second device and appears to have been sent from the first device. In some embodiments, the server determines 636 that the first time stamp is inconsistent with the second time stamp. For example, the first time stamp is at a later time than the second time stamp, or a difference between the first time stamp and the second time stamp satisfies a threshold. This determination indicates that the first email was likely not sent by the first email application and instead was sent by malware on the sender's email device or by another device using the sender's compromised credentials.

In response to detecting the inconsistency, the email monitoring system identifies 640 the first email as being potentially malicious.

In some embodiments, the email monitoring system notifies 642 at least one of the first and second devices that the first email is potentially malicious (e.g., as described for steps 536 and 538, FIG. 5A). For example, the server notifies 644 the second device that the incoming email is potentially malicious.

Although some of various drawings illustrate a number of logical stages in a particular order, stages, which are not order dependent, may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
   at a server system associated with an email monitoring service, the server system having one or more processors and memory storing instructions for execution by the one or more processors:
   monitoring email use in a first email application at a first device distinct from the server system;
   monitoring email use in a second email application at a second device distinct from the server system;
   wherein:
   monitoring email use in the first and second email applications comprises installing an email monitoring application on the first and second devices;
   the email monitoring application installed on the first device creates an outgoing log of emails sent from the first email application, the outgoing log comprising respective entries for respective outgoing emails; and the email monitoring application installed on the second device creates an incoming log of emails received by the second email application, the incoming log comprising entries for respective incoming emails;

receiving time stamps of log entries for respective outgoing emails from the email monitoring application on the first device, including a first time stamp of a log entry for a first email;

receiving time stamps of log entries for respective incoming emails from the email monitoring application on the second device, including a second time stamp of a log entry for a first email;

comparing the time stamps of the log entries for respective outgoing emails with the time stamps of the log entries for respective incoming emails;

detecting an inconsistency in the monitored email use for the first email, which was received by the second device and appears to have been sent from the first device, wherein detecting the inconsistency comprises determining that the first time stamp is inconsistent with the second time stamp; and in response to detecting the inconsistency, identifying the first email as being potentially malicious, and notifying at least one of the first and second devices that the first email is potentially malicious.

2. The method of claim 1, wherein determining that the first time stamp is inconsistent with the second time stamp comprises determining that a difference between the first time stamp and the second time stamp satisfies a threshold.

3. The method of claim 1, wherein the notifying comprises notifying the second device that the incoming email is potentially malicious.

4. The method of claim 1, wherein:
monitoring email use in the second email application comprises receiving an indication from the second device that the first email was received;
monitoring email use in the first email application comprises receiving no indication from the first device that the first email was sent;
detecting the inconsistency comprises identifying that the indication from the second device was received and that no indication from the first device was received; and
the method further comprises notifying at least one of the first and second devices that the first email is potentially malicious.

5. The method of claim 4, wherein:
monitoring email use in the first and second email applications comprises installing an email monitoring application on the first and second devices;
the email monitoring application installed on the first device creates a log of outgoing emails from the first email application, the log comprising respective entries for respective outgoing emails;
the email monitoring application installed on the second device creates a log of incoming emails received by the second email application, the log comprising entries for respective incoming emails;
receiving the indication from the second device comprises receiving a log entry for the first email from the email monitoring application installed on the second device; and
receiving no indication from the first device comprises receiving no log entry for the first email from the email monitoring application installed on the first device.

6. The method of claim 1, wherein:
monitoring email use in the first email application comprises monitoring when the first email application is active;
monitoring email use in the second email application comprises receiving a time stamp for the first email from the second device;
detecting the inconsistency comprises determining that the first email application was inactive at a time corresponding to the time stamp for the first email received from the second device; and
the method further comprises notifying at least one of the first and second devices that the first email is potentially malicious.

7. The method of claim 6, wherein determining that the first email application was inactive at a time corresponding to the time stamp comprises determining that the first email application was inactive throughout a specified time period preceding the time stamp.

8. The method of claim 1, wherein:
the first email includes a first time stamp;
monitoring email use in the first email application comprises receiving a second time stamp from the first device corresponding to a time when the first email was sent;
detecting the inconsistency comprises determining that the first time stamp is inconsistent with the second time stamp; and
notifying at least one of the first and second devices that the first email is potentially malicious.

9. The method of claim 8, wherein determining that the first time stamp is inconsistent with the second time stamp comprises determining that a difference between the first time stamp and the second time stamp satisfies a threshold.

10. The method of claim 1, wherein:
the first email includes a first time stamp;
monitoring email use in the second email application comprises receiving a second time stamp from the second device corresponding to a time when the first email was received;
detecting the inconsistency comprises determining that the first time stamp is inconsistent with the second time stamp; and
the method further comprises notifying at least one of the first and second devices that the first email is potentially malicious.

11. The method of claim 10, wherein determining that the first time stamp is inconsistent with the second time stamp comprises determining that a difference between the first time stamp and the second time stamp satisfies a threshold.

12. The method of claim 1, wherein the first device is a first client device and the second device is a second client device.

13. The method of claim 1, wherein the first device is a first client device and the second device is an email server.

14. A server system, comprising:
one or more processors; and
memory storing one or more programs for execution by the one or more processors, the one or more programs including instructions for:
monitoring email use in a first email application at a first device distinct from the server system;
monitoring email use in a second email application at a second device distinct from the server system;
wherein:
monitoring email use in the first and second email applications comprises installing an email monitoring application on the first and second devices;
the email monitoring application installed on the first device creates an outgoing log of emails sent from the first email application, the outgoing log comprising respective entries for respective outgoing emails; and the email monitoring application installed on the second device creates an incoming log of emails received by the second email application, the incoming log comprising entries for respective incoming emails;

receiving time stamps of log entries for respective outgoing emails from the email monitoring application on the first device, including a first time stamp of a log entry for a first email;

receiving time stamps of log entries for respective incoming emails from the email monitoring application on the second device, including a second time stamp of a log entry for the first email;

comparing the time stamps of the log entries for respective outgoing emails with the time stamps of the log entries for respective incoming emails;

detecting an inconsistency in the monitored email use for the first email, which was received by the second device and appears to have been sent from the first device, wherein detecting the inconsistency comprises determining that the first time stamp is inconsistent with the second time stamp; and in response to detecting the inconsistency, identifying the email as being potentially malicious, and notifying at least one of the first and second devices that the first email is potentially malicious.

15. A non-transitory computer-readable storage medium storing one or more programs for execution by one or more processors of a server system, the one or more programs including instructions for:

monitoring email use in a first email application at a first device distinct from the server system;

monitoring email use in a second email application at a second device distinct from the server system;

wherein:

monitoring email use in the first and second email applications comprises installing an email monitoring application on the first and second devices;

the email monitoring application installed on the first device creates an outgoing log of emails sent from the first email application, the outgoing log comprising respective entries for respective outgoing emails; and the email monitoring application installed on the second device creates an incoming log of emails received by the second email application, the incoming log comprising entries for respective incoming emails;

receiving time stamps of log entries for respective outgoing emails from the email monitoring application on the first device, including a first time stamp of a log entry for a first email;

receiving time stamps of log entries for respective incoming emails from the email monitoring application on the second device, including a second time stamp of a log entry for the first email;

comparing the time stamps of the log entries for respective outgoing emails with the time stamps of the log entries for respective incoming emails;

detecting an inconsistency in the monitored email use for the first email, which was received by the second device and appears to have been sent from the first device, wherein detecting the inconsistency comprises determining that the first time stamp is inconsistent with the second time stamp; and in response to detecting the inconsistency, identifying the email as being potentially malicious, and notifying at least one of the first and second devices that the first email is potentially malicious.

* * * * *